United States Patent [19]

Hauk et al.

[11] Patent Number: 4,857,105
[45] Date of Patent: Aug. 15, 1989

[54] PROCESS FOR PRODUCING PIG IRON USING COAL DEGASSING REACTOR TO FORM REDUCTANTS

[75] Inventors: Rolf Hauk, Düsseldorf; Gero Papst, Kaarst, both of Fed. Rep. of Germany

[73] Assignee: Korf Engineering GmbH, Dusseldorf, Fed. Rep. of Germany

[21] Appl. No.: 133,054

[22] Filed: Dec. 15, 1987

[30] Foreign Application Priority Data

Dec. 23, 1986 [DE] Fed. Rep. of Germany ....... 3644775

[51] Int. Cl.$^4$ .............................................. C22B 13/02
[52] U.S. Cl. .......................................... 75/38; 75/40; 201/27
[58] Field of Search .................. 75/38, 40; 201/32, 27

[56] References Cited

U.S. PATENT DOCUMENTS 3,414,480 12/1968 Stotler et al. ......................... 201/31
4,678,508 7/1987 Saeki et al. ............................... 75/38

FOREIGN PATENT DOCUMENTS 380697 6/1986 Austria .
3345107A1 9/1984 Fed. Rep. of Germany .

*Primary Examiner*—Melvyn J. Andrews
*Attorney, Agent, or Firm*—Barnes & Thornburg

[57] ABSTRACT

A novel process for producing molten pig iron or steel raw material is described. The pig iron is initially at least partly reduced to sponge iron by means of a reducing gas and is then melted in a melting gasifier, being optionally finally reduced. Apart from the sponge iron, the melting gasifier is supplied with coal at least partly degassed by a hot gas and oxygen-containing gas. The hot gas used for this purpose is formed from the gas produced during degassing and a supplied, oxygen-containing gas. The latter is preferably constituted by air, which can be preheated by the gas produced during degassing.

21 Claims, 1 Drawing Sheet

U.S. Patent  Aug. 15, 1989  4,857,105
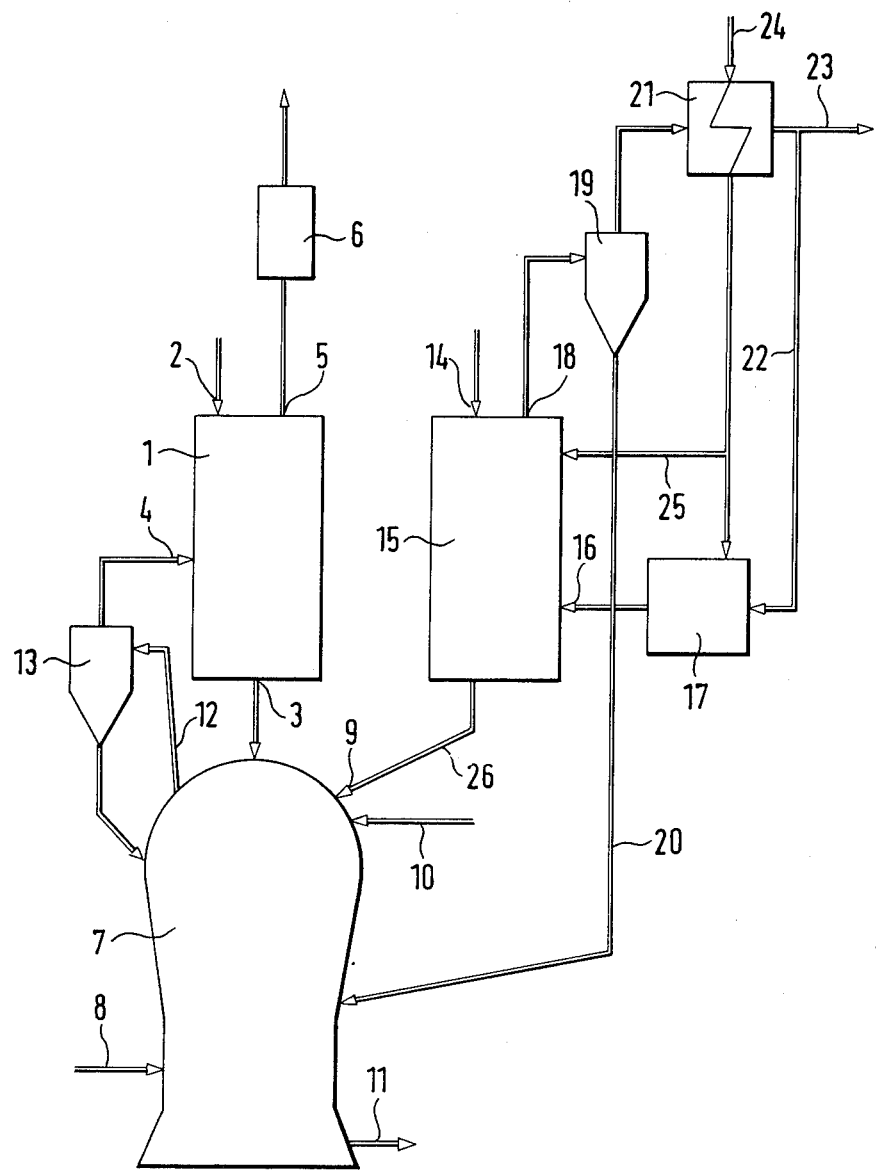

PROCESS FOR PRODUCING PIG IRON USING COAL DEGASSING REACTOR TO FORM REDUCTANTS

For direct introduction into the melting gasifier, such a process requires coal with a volatile component content of less than 40% (waf). Coal with a higher proportion of volatile components, must therefore be mixed with higher quality coal or must initially be converted into coke or semicoke, e.g. into high-temperature carbonized coke.

DE-OS No. 33 45 107 discloses a process for melting at least partly reduced iron ore, particularly sponge iron, in a melting gasifier. From the introduced coal and the blown in oxygen-containing gas, in the melting gasifier are produced the temperature necessary for melting the reduced iron ore, heat and a reducing gas. In order to be able to use coal with a relatively high content of volatile components for this process, it is coked prior to the introduction into the melting gasifier or is substantially freed from the volatile components and is then introduced with its sensible heat into the melting gasifier. Coking takes place in a hearth-type furnace, the reducing gases produced in the melting gasifier being preferably used for the heating thereof. However, due to its limited throughput, coking in hearth-type furnaces is expensive and prejudicial to the environment, because tar, phenols and other harmful substances are formed.

Austrian patent No. 380 697 also discloses a process for melting at least partly reduced iron ore in a melting gasifier, in which degassing of the coal to be introduced is carried out in a degassing reactor connected to the head of the melting gasifier and to which the hot waste gases of the following melting gasifier, oxygen and optionally blast furnace gas from ore reduction are supplied. The gas passing out of the degassing reactor is supplied to a reducing shaft furnace for the at least partial reduction of the iron ore following dust removal. This gas must consequently contain a considerable proportion of reducing constituents, i.e. CO and $H_2$. Therefore the degassing process must be correspondingly controlled, which means that part of the introduced coal must be burnt. In addition, the undesired substances produced during degassing, such as tar and the like are introduced into the reducing shaft furnace, which is prejudicial to the reduction process. Sulphur absorbed by the gas during the degassing of the coal should be removed therefrom prior to introduction into the reducing shaft furnace, which leads to an increase in apparatus expenditure.

The problem of the present invention is therefore to so improve the known process for the production of pig iron, that the degassing of the coal takes place without combustion of part thereof and that nevertheless the reduction process is performed with a gas, which meets the requirements of the process in the best possible way.

As the hot gas used for degassing is formed from the gas produced during degassing and a supplied, oxygen-containing gas, i.e. the hot gas required for degassing is substantially produced from the actual degassing process, there is neither a partial combustion of the coal during degassing, nor any supply of energy from the outside. Thus, the inventive process is very economical with regards to the use of energy carriers.

For forming the hot gas, additionally use is preferably made of the blast furnace gas obtained during the reduction of the iron ore. Thus, the thermal energy and its combustion energy contained in the blast furnace gas can be used for the degassing process.

The oxygen-containing gas used for producing the hot gas preferably comprises air, which can be preheated by heat exchange by the gas obtained during degassing. The gas obtained during degassing is appropriately cleaned or purified and the separated solids are directly fed into the melting gasifier.

The invention is described in greater detail hereinafter relative to an embodiment shown in the drawing. The latter shows an iron ore reduction plant, in which the iron ore is converted into molten pig iron.

By means of a charging opening 2, iron ore and any fluxes are fed into a reducing shaft furnace 1. By means of a lower exit port 3, the sponge iron obtained through the reduction of the iron ore is discharged. For performing the reduction, reducing gas is supplied to the reducing shaft furnace 1 in the so-called bustle plane by means of inlet ports 4, whereby it flows upwards in opposition to the oxidic iron ore sinking in the reducing shaft furnace 1 and directly reduces it to sponge iron. The reducing gas contains reducing constituents, such as CO and $H_2$. It also has a temperature suitable for the reduction, which is roughly in the range 750° to 950° C. The reducing gas consumed is drawn off as exhaust gas through an upper outlet port 5 of the reducing shaft furnace 1 and is cleaned in a washer 6, as well as being optionally freed from $CO_2$, prior to appropriate reuse.

The sponge iron passes from the reducing shaft furnace 1, preferably via downcomers into a melting gasifier 7. It falls from above onto a fluidized bed, which is maintained in the lower region of the melting gasifier 7 by oxygen-containing gas blown in via inlet ports 8. From above into the melting gasifier are also introduced by means of a charging opening 9 coke and via a charging opening 10 optionally coal.

Through the combustion of the coke and optionally the coal under the action of the oxygen-containing gas in the fluidized bed, sufficient heat is produced to ensure the melting of the sponge iron. In the molten state, it is finally reduced by the carbon, so that a pig iron melt collects on the bottom of melting gasifier 7 and molten slag collects above it. These two melts are drawn off at predetermined time intervals by means of different outlet ports 11, which are preferably arranged at different levels.

During the combustion of the coke and optionally coal in the melting gasifier 7 reducing constituents continue to be formed and preferably CO-containing hot gas, which is led out by means of an outlet port 12 in the head of melting gasifier 7 and is cleaned in a cyclone 13, before being passed as reducing gas, via inlet ports 4 into the reducing shaft furnace 1. The solids separated from the gas in cyclone 13 are preferably returned to the melting gasifier 7 level with the fluidized bed.

The coke charged into the melting gasifier 7 is produced from coal with a high proportion of volatile constituents, preferably more than 40% (waf). For this purpose, the coal is fed by means of an inlet port 14 into a degassing reactor 15, in which the coal is subject to the action of a hot gas and is consequently degassed. The hot gas is blown in by means of inlet ports 16 in the lower region of the degassing reactor 15, so that preferably a fluidized bed forms in degassing reactor 15. There are several inlet ports 16 at the same level, which are constructed in nozzle-like manner and are connected together and also to a hot gas generator 17 by a ring main. The inlet ports 16 can be made from ceramic bricks.

The hot gas generator 17 contains a combustion chamber, in which flammable gases are burnt with the aid of air. These flammable gases at least to a considerable extent consist of the gases produced during the degassing process. They are drawn off by means of an upper outlet 18 of degassing reactor 15 and initially passed into a cyclone 19. The solids deposited in cyclone 19 are fed via a line 20 directly into the melting gasifier 7. The gas cleaned in cyclone 19 passes into a heat exchanger 21, in which the air used for forming the hot gas is preheated to a temperature e.g. in the range 300° to 400° C. After passing through the heat exchanger 21, part of the waste gas of degassing reactor 15 is led via a line 22 into the combustion chamber of the hot gas generator 17. The quantity of this waste gas of degassing reactor 15 used for producing the hot gas is dependent on the hot gas required for degassing purposes. The waste gas which is not required is led off via a line 23 and is used elsewhere.

The air is passed in a line 24 through the heat exchanger 21 and is then blown into the combustion chamber of the hot gas generator 17. Part of the preheated air is branched off by means of a line 25 and led into the upper part of the degassing reactor 15. As a result the temperature of the gases formed therein can be regulated in such a way that there is no tar formation. The waste gas passing out via outlet 18 e.g. has a temperature of approximately 800° C.

The hot gas blown in by means of inlet ports 16 leads to the formation of a fluidized bed in degassing reactor 15. The coal fed in from above is degassed and dried in this fluidized bed. To the coal can be added a desulphurizing agent, e.g. dolomite or limestone. As a function of the fine grain size of the desulphurizing agent, it is led out of the degassing reactor 15 via outlet 18 either with the coke or with the waste gas.

The coke passes via a line 26, which issues into the bottom of the degassing reactor 15, out of the same and into the melting gasifier 7. For discharging the coke from degassing reactor 15, several radially directed screw conveyors are arranged over its bottom.

The gas pressure in degassing reactor 15 is preferably adjusted in such a way that it corresponds to the gas pressure in melting gasifier 7. This prevents a gas exchange between the melting gasifier 7 and the degassing reactor 15, without it being necessary to use a complicated lock system. As the flammable gas for producing the hot gas, in addition to the waste gas of degassing reactor 15, it is also possible to use exhaust gas from the reducing shaft furnace 1, if there is not sufficient waste gas from the degassing reactor to achieve adequate degassing. This obviates the need in this case of supplying external energy or having to burn part of the coal to be degassed.

The exhaust gas of reducing shaft furnace 1 is generally also partly returned to the reducing process in that, following $CO_2$ removal, it is admixed with the reducing gas prior to blowing into the reducing shaft furnace. On returning the shaft furnace exhaust gas without $CO_2$ removal into the gasifier, it is advantageous to degas all the coal to be fed into the melting gasifier 7 in degassing reactor 15 beforehand, i.e. no additional coal is introduced via inlet port 10. However, if there is no shaft furnace exhaust gas return, then only part of the coal need be degassed prior to introduction into the melting gasifier 7. Part of the coal, e.g. 50% can then, following drying, be directly supplied to melting gasifier 7 via inlet port 10.

In addition to the degassing of the coal, the degassing reactor can also be used for the prereduction of iron ore. This is introduced into the degassing reactor in addition to the coal and is preheated and prereduced therein and is then fed into the melting gasifier together with the coke. This measure can take place instead of the prereduction in the reducing shaft furnace or in addition thereto. The ore prereduced in the degassing reactor can, if it is in a corresponding fine grain form, be entrained with the waste gas of the degasifier and then separated in a cyclone. It is then fed from the latter to the melting gasifier and is blown into the fluidized bed formed therein. Several fluidized beds can be formed in the degassing reactor for the prereduction of the iron ore.

We claim:
1. A process for producing molten pig iron or steel raw material comprising the steps of:
   a. introducing iron ore into a reducing shaft furnace supplied with a reducing gas to produce an at least partially reduced iron and a shaft furnace exhaust gas,
   b. transporting the at least partially reduced iron to a melting gasifier,
   c. introducing coal into a degassing reactor,
   d. supplying the degassing reactor with a hot coal degassing gas to form both coke and flammable gasses,
   e. mixing a portion of the flammable gasses with an oxygen containing gas in a hot gas generator to form the hot coal degassing gas for supplying the degassing reactor;
   f. supplying the melting gasifier with said coke; and
   g. melting at least partially the at least partially reduced iron in the melting gasifier.

2. The process according to claim 1, characterized in that the oxygen-containing gas employed for forming the hot coal degassing gas consists of air.

3. The process according to claim 2, characterized in that the air is preheated by the flammable gasses.

4. The process according to claim 3, characterized in that the flammable gasses are kept at a specific temperature level to avoid tar formation.

5. The process according the claim 4, characterized in that preparing coke takes place in a fluidized bed in a degassing reactor.

6. The process according to claim 5, characterized in that the flammable gasses are cleaned and the solids separated therefrom are fed into the melting gasifier.

7. The process according claim 6, characterized in that a desulphurizing agent is added to the coal prior to degassing in the coal degassing reactor.

8. The process according to claim 1 characterized in that use is additionally made of said shaft furnace exhaust gas produced during the reduction of the iron ore for forming the hot coal degassing gas.

9. The process according to claim 1, characterized in that the hot coal degassing gas is subjected to combustion prior to contacting the coal.

10. The process according to claim 9, characterized in that the gas pressure of the hot coal degassing gas is adjusted to the gas pressure in the head of the melting gasifier.

11. The process according to claim 10, characterized in that combustion air is added to the hot coal degassing gas in the vicinity of a gas outlet.

12. The improved process of claim 1 wherein prior to said mixing, the supply of oxygen-containing gas is preheated by the flammable gasses.

13. The improved process of claim 1 further comprising controlling the relative amounts of the gasses in the mixing step so as to permit combustion of the mixed gasses to form the hot coal-degassing gas.

14. The improved process of claim 13 further comprising contacting the gas produced as a result of the coal degassing with an additional amount of the oxygen-containing gas so as to regulate the temperature preventing the formation of tar.

15. The improved process of claim 1 wherein prior to said mixing, the flammable gasses are cleaned of any solids.

16. A process for producing molten pig iron or steel raw material comprising the steps of:
   a. introducing iron ore into a reducing shaft furnace supplied with a reducing gas to produce an at least partially reduced iron and a shaft furnace exhaust gas,
   b. transporting the at least partially reduced iron to a melting gasifier,
   c. introducing coal into a degassing reactor,
   d. mixing a portion of the shaft furnace exhaust gas with a gas withdrawn from the degassing reactor in a hot gas generator to form a hot coal degassing gas,
   e. supplying the degassing reactor with the hot coal degassing gas to form both coke and flammable gasses,
   f. mixing a portion of the flammable gasses with an oxygen containing gas for introduction to the hot gas generator;
   g. supplying the melting gasifier with said coke; and
   h. melting at least partially the at least partially reduced iron in the melting gasifier.

17. A process for producing molten pig iron or steel raw material comprising the steps of:
   a. introducing iron ore into a reducing shaft furnace supplied with a reducing gas to produce an at least partially reduced iron and a shaft furnace exhaust gas;
   b. introducing coal into a degassing reactor supplied with a hot coal degassing gas to form coke and flammable gasses;
   c. mixing a portion of the flammable gasses with an oxygen containing gas in a hot gas generator to form the hot coal degassing gas supplied to the degassing reactor; and
   d. introducing the at least partially reduced iron and the coke into a melting gasifier wherein the iron is melted.

18. The process of claim 17 further comprising the step of mixing a portion of the shaft furnace exhaust gas emmitted from the shaft furnace with the other gasses introduced into the hot gas generator.

19. The process of claim 17 further comprising the step of adding coal to the melting gasifier to aid in the melting of the iron.

20. A process for producing molten pig iron or steel raw material comprising the steps of:
   a. introducing iron ore into a reducing shaft furnace supplied with a reducing gas to produce an at least partially reduced iron and a shaft furnace exhaust gas;
   b. mixing a portion of the shaft furnace exhaust gas with an oxygen containing gas in a hot gas generator to form a hot coal degassing gas supplied to a degassing reactor;
   c. introducing coal into the degassing reactor supplied with the hot coal degassing gas to form coke and flammable gasses; and
   d. introducing the at least partially reduced iron and the coke into a melting gasifier wherein the iron is melted.

21. The process of claim 20 further comprising the step of mixing a portion of the flammable gasses emitted from the degassing reactor with the other gasses introduced into the hot gas generator.

* * * * *